US009867499B2

(12) United States Patent
McNerney et al.

(10) Patent No.: US 9,867,499 B2
(45) Date of Patent: Jan. 16, 2018

(54) COOKING DEVICE WITH COOKING INSERT

(71) Applicant: Spectrum Brands, Inc., Middleton, WI (US)

(72) Inventors: Gerald J. McNerney, Middleton, WI (US); Casey A. Klock, Fitchburg, WI (US); Jake Levin, Middleton, WI (US)

(73) Assignee: SPECTRUM BRANDS, INC., Middleton, WI (US)

( * ) Notice: Subject to any disclaimer, the term of this patent is extended or adjusted under 35 U.S.C. 154(b) by 2 days.

(21) Appl. No.: 14/802,175

(22) Filed: Jul. 17, 2015

(65) Prior Publication Data
US 2017/0013998 A1   Jan. 19, 2017

(51) Int. Cl.
*A47J 37/04* (2006.01)
*A47J 37/06* (2006.01)

(52) U.S. Cl.
CPC ................ *A47J 37/0611* (2013.01)

(58) Field of Classification Search
CPC ............ A47J 37/0611; A47J 2037/0617
USPC ......... 99/324, 325, 331, 338, 339, 340, 341, 99/344, 372–384, 385, 389, 391, 400, 99/401, 444–450, 450.1, 450.6, 450.7; 219/200, 385, 391, 399, 400, 521, 524, 219/525, 536, 685; 426/106, 107, 138, 426/234, 237, 241, 243, 441, 442, 501, 426/514, 520, 523, 665; 220/573.1, 912
See application file for complete search history.

(56) References Cited

U.S. PATENT DOCUMENTS

| 1,706,612 | A | * | 3/1929 | Jaeger | A47J 37/0611 |
| | | | | | 99/375 |
| 1,947,124 | A | | 2/1934 | Clauss | |
| D162,041 | S | | 2/1951 | Klein | |
| 4,011,431 | A | | 3/1977 | Levin | |
| 4,345,516 | A | | 8/1982 | Sinclair | |
| 4,512,250 | A | | 4/1985 | Schindler et al. | |
| 4,969,449 | A | | 11/1990 | Levin | |
| 5,062,408 | A | | 11/1991 | Smith et al. | |
| 5,606,905 | A | * | 3/1997 | Boehm | A47J 37/0611 |
| | | | | | 126/369 |
| D414,981 | S | | 10/1999 | Roskind et al. | |
| 6,016,741 | A | * | 1/2000 | Tsai | A47J 37/0611 |
| | | | | | 99/341 |
| 6,170,389 | B1 | | 1/2001 | Brady | |

(Continued)

OTHER PUBLICATIONS

International Search Report and Written Opinion issued in corresponding International Application No. PCT/US2016/042768, dated Oct. 12, 2016.

(Continued)

*Primary Examiner* — Dana Ross
*Assistant Examiner* — Joseph Iskra
(74) *Attorney, Agent, or Firm* — Banner & Witcoff, Ltd.

(57) ABSTRACT

A cooking insert for use with a cooking device may include a lower cooking plate and an upper cooking plate connected to the lower plate with a floating hinge, with the lower plate having a plurality of ribs formed on an upper surface thereof. The insert may include a base member having a first portion and a second portion, with the first portion defining a cooking surface. A cavity formed in an upper surface of the second portion is suitable for cooking a liquid egg therein.

46 Claims, 10 Drawing Sheets

(56) References Cited

U.S. PATENT DOCUMENTS

| | | | |
|---|---|---|---|
| 6,429,409 B1* | 8/2002 | Siu | A47J 37/0611 219/450.1 |
| 6,546,850 B1* | 4/2003 | Akiyama-Warren | A47J 36/20 220/573.4 |
| 6,718,866 B1 | 4/2004 | Robinson | |
| D492,538 S | 7/2004 | Cheng | |
| 6,994,017 B2 | 2/2006 | Lerner | |
| 7,104,187 B1 | 9/2006 | Robinson | |
| D549,515 S | 8/2007 | Curtin et al. | |
| D643,676 S | 8/2011 | Lavy et al. | |
| D679,135 S | 4/2013 | Valera | |
| D679,136 S | 4/2013 | Valera | |
| D679,944 S | 4/2013 | Meyer | |
| D682,013 S | 5/2013 | Huang | |
| 2003/0183625 A1 | 10/2003 | Hoh | |
| 2004/0217109 A1 | 11/2004 | Chang | |
| 2005/0045046 A1 | 3/2005 | Cheng | |
| 2005/0247210 A1 | 11/2005 | Ragan | |
| 2006/0049164 A1 | 3/2006 | Bryan | |
| 2006/0249506 A1* | 11/2006 | Robertson | A47J 37/0611 219/450.1 |
| 2006/0272511 A1* | 12/2006 | Dreimann | A47J 37/0611 99/372 |
| 2006/0283334 A1 | 12/2006 | Ho | |
| 2007/0006740 A1* | 1/2007 | Lam | A47J 37/0611 99/372 |
| 2008/0105137 A1 | 5/2008 | Genslak et al. | |
| 2011/0011277 A1* | 1/2011 | Bond | A47J 37/0611 99/375 |
| 2013/0112086 A1 | 5/2013 | Lamont | |

OTHER PUBLICATIONS

International Search Report and Written Opinion issued in corresponding International Application No. PCT/US2015/056386, dated Jan. 28, 2016.

* cited by examiner

COOKING DEVICE WITH COOKING INSERT

FIELD OF THE INVENTION

Aspects of this invention relate generally to a cooking device and, in particular, to a cooking device with a cooking insert configured to cook the ingredients for a breakfast sandwich.

BACKGROUND OF THE INVENTION

Cooking devices with lower and upper cooking plates are known for grilling food. The lower plate may include a ribbed upper surface and be sloped or slanted toward its front edge, allowing liquids, such as grease, to flow downwardly through grooves or channels formed between the ribs. The grease and liquids can be collected in a container or well positioned beneath the front edge of the lower plate. One exemplary cooking device is shown and described in U.S. Pat. No. 5,606,905, the entire disclosure of which is incorporated herein in its entirety for all purposes.

Breakfast sandwiches are a popular food item, which may be made from scratch, but are often purchased in fast food restaurant or other store in ready-to-eat fashion. Breakfast sandwiches may include a breakfast meat, such as bacon or sausage, and a cooked egg on a bread item. The breakfast sandwich may also include cheese. The bread item is often a bagel, an English muffin, or a biscuit. Cooking the ingredients for a breakfast sandwich in one's own home often requires the use of multiple cooking devices, such as a stove, a toaster, and a microwave. It would be desirable to have a convenient way of making such breakfast sandwiches at home using a cooking device such as that described above.

Particular objects and advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide a cooking insert for use in conjunction with a cooking device. In accordance with a first aspect, a cooking insert for use with a cooking device may include a base unit including a lower cooking plate having a plurality of ribs formed on an upper surface thereof, and an upper unit including an upper cooking plate and pivotally connected to the base unit with a floating hinge. The insert may include a base member having a first portion and a second portion, with the first portion defining a cooking surface. A cavity formed in an upper surface of the second portion is suitable for cooking a liquid egg therein.

In accordance with another aspect, a cooking device may include a base unit having a lower cooking plate with a plurality of ribs formed on an upper surface of the lower cooking plate. An upper unit may include an upper cooking plate and be pivotally connected to the base unit with a floating hinge. A cooking insert may be configured to be positioned between the lower and upper cooking plates and include a base member having a first portion and a second portion. The first portion may define a cooking surface; and a cavity may be formed in an upper surface of the second portion.

In accordance with a further aspect, a cooking device includes a base unit including a lower cooking plate, with a plurality of ribs formed on an upper surface of the lower cooking plate. An upper unit includes an upper cooking plate, and a heating surface formed on an upper surface of the upper unit, with the upper unit pivotally connected to the base unit with a floating hinge. A lid is pivotally connected to the upper unit and operable to cover and uncover the heating surface when it is in a closed and an open condition, respectively. A cooking insert is configured to be positioned between the lower and upper cooking plates and includes a base member including a first portion and a second portion. The first portion defines a cooking surface, with a bottom surface of the base member including a plurality of grooves, each groove configured to receive a rib of the lower cooking plate. A cavity is formed in an upper surface of the second portion.

Additional features and advantages of cooking devices with cooking inserts as disclosed here will be further understood from the following detailed disclosure of certain embodiments.

Figure 1:
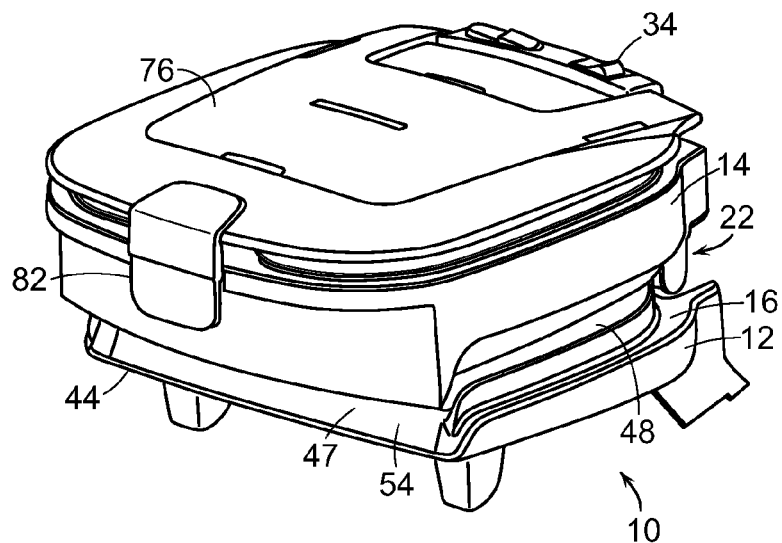
FIG. 1 is a perspective view of a cooking device in a closed condition, with a cooking insert positioned within the cooking device.

The figures referred to above are not drawn necessarily to scale, should be understood to provide a representation of particular embodiments of the invention, and are merely conceptual in nature and illustrative of the principles involved. Some features of the cooking device with a cooking insert have been enlarged or distorted relative to others to facilitate explanation and understanding. The same reference numbers are used in the drawings for similar or identical components and features shown in various alternative embodiments. Cooking devices with cooking inserts as disclosed herein would have configurations and components determined, in part, by the intended application and environment in which they are used.

DETAILED DESCRIPTION OF CERTAIN PREFERRED EMBODIMENTS

Various different examples and embodiments of the inventive subject matter disclosed here are possible and will be apparent to the person of ordinary skill in the art, given the benefit of this disclosure. In this disclosure reference to "some embodiments," "certain embodiments," "certain exemplary embodiments" and similar phrases each means that those embodiments are merely non-limiting examples of the inventive subject matter, and there are alternative embodiments which are not excluded. Unless otherwise indicated or unless otherwise clear from the context in which it is described, alternative and optional elements or features in any of the disclosed embodiments and examples are interchangeable with each other. That is, an element described in one embodiment or example should be understood to be interchangeable or substitutable for one or more corresponding but different elements in another described example or embodiment and, likewise, an optional feature of one embodiment or example may optionally also be used in other embodiments and examples. More generally, the elements and features of any disclosed example or embodiment should be understood to be disclosed generally for use with other aspects and other examples and embodiments. A reference to a component being operative or configured to perform one or more specified functions, tasks, and/or operations or the like, is intended to mean that it can perform such function(s), task(s), and/or operation(s) in at least certain embodiments, and may well be able to perform one or more other functions, tasks, and/or operations.

While this disclosure mentions specific examples and embodiments, those skilled in the art will appreciate that there are numerous variations and modifications within the spirit and scope of the invention as set forth in the appended claims. Each word and phrase used in the claims is intended to include all its dictionary meanings consistent with its usage in this disclosure and/or with its technical and industry usage in any relevant technology area. Indefinite articles, such as "a," and "an" and the definite article "the" and other such words and phrases are used in the claims in the usual and traditional way in patents, to mean "at least one" or "one or more." The word "comprising" is used in the claims to have its traditional, open-ended meaning, that is, to mean that the product or process defined by the claim may optionally also have additional features, elements, etc. beyond those expressly recited in the claim.

As used here and in the accompanying claims, directional terms used in describing the cooking device and cooking insert disclosed herein should be understood to have their ordinary meaning with reference to gravity, including, e.g., up, down, over, under, etc. Accordingly, for example, an up-down direction is vertical as that term is commonly used. It should be further understood, however, that directional or positional references to portions of a cooking device with a cooking insert as disclosed herein refer to the orientation of the cooking device and cooking insert in ordinary use. Thus, the underside of a cooking device and cooking insert are the sides normally facing down when cooking device is positioned within the cooking device in its intended or ordinary configuration during use.

Figure 2:
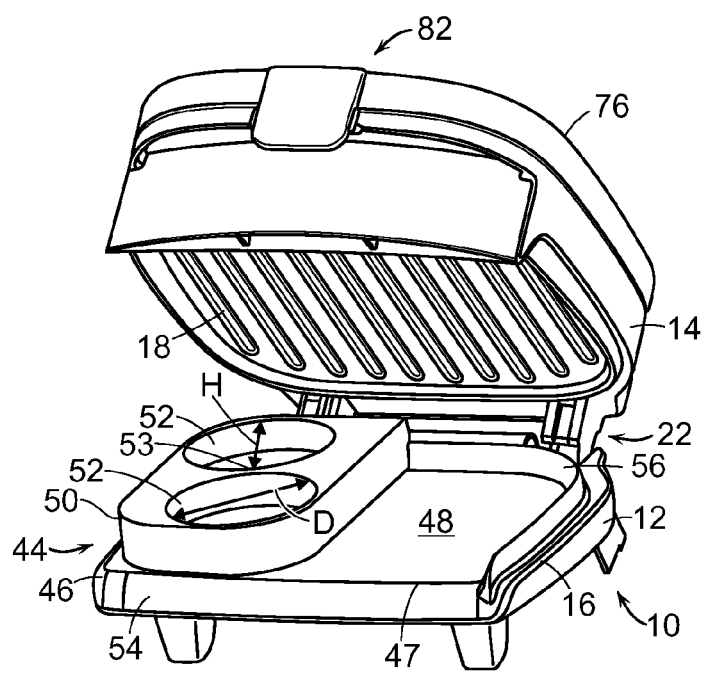
FIG. 2 is a perspective view of the cooking device of FIG. 1 in an open condition, with the cooking insert positioned on a lower cooking plate of the cooking device.
Figure 3:
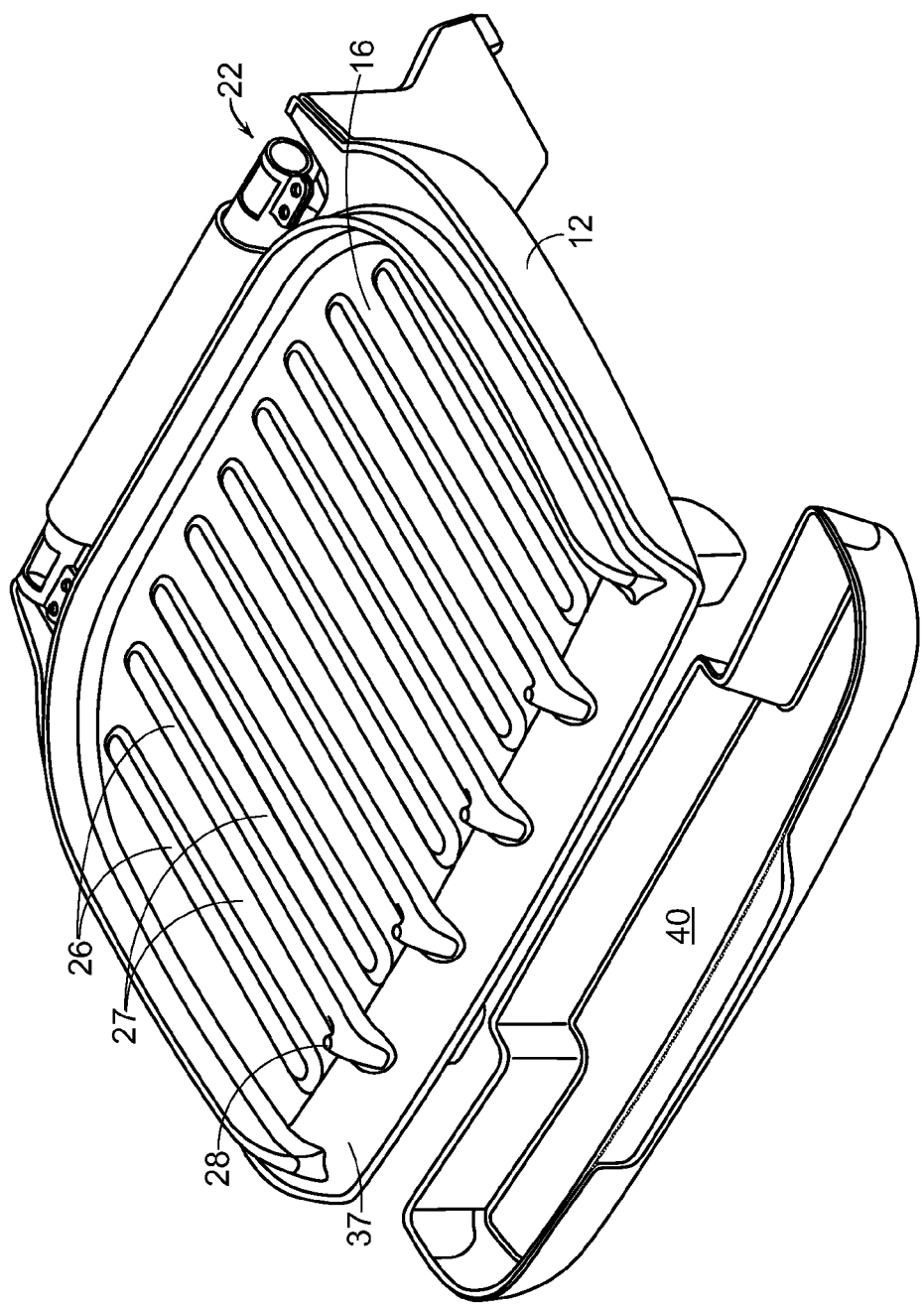
FIG. 3 is a perspective view of the base unit of the cooking device of FIG. 1, showing the lower cooking plate and a collecting member.

An illustrative embodiment of a cooking device 10 is shown in FIGS. 1-3. Cooking device 10 includes a base unit 12 and an upper unit 14. Base unit 12 includes a lower cooking plate 16, and upper unit 14 includes an upper cooking plate 18. In certain embodiments, each of lower cooking plate 16 and upper cooking plate 18 may be removable from cooking device 10, facilitating cleanup of the plates.

Upper unit 14 may be movable relative to base unit 12 between a closed position as seen in FIG. 1 and an open position as seen in FIG. 2. Base unit 12 and upper unit 14 may be pivotally connected by a first floating hinge 22 that allows the top unit to move vertically, and to be pivotally moved relative to the base unit 12 from the closed position to the open position. An exemplary cooking device is shown and described in greater detail in U.S. Pat. No. 5,606,905, and a suitable floating hinge is shown and described in U.S. Pat. No. 5,363,748.

Lower cooking plate 16 of base unit 12 may include an upper surface at an angle to the horizontal plane of device 10, sloping downwardly from a rear edge of lower cooking plate 16 to a front edge thereof. In certain embodiments, lower cooking plate may be sloped downwardly from back to front at an angle of approximately 8°, although any acute angle to the horizontal plane of device 10 may be utilized.

In certain embodiments, as illustrated in FIG. 3, lower cooking plate 16 may include a plurality of ribs 26 that act as grilling members, with corresponding grooves 27 formed between ribs 26. Ribs 26 may be of unitary, that is, one-piece construction with lower cooking plate 16. Alternatively, ribs 26 could be separately formed and subsequently secured to the upper surface of lower cooking plate 16 in any suitable manner. As illustrated here, ribs 26 are substantially hemispherical in cross-section. It is to be appreciated that ribs 26 can have any desired cross-sectional shape. Ribs 26 and grooves 27 may be substantially parallel with one another, allowing liquids from cooked food to flow downwardly along lower cooking plate through grooves 27 in an unimpeded fashion. The term "substantially parallel" as used herein with respect to ribs 26 and grooves 27 is to be understood to mean that ribs 26 and grooves 27 are designed to be and are parallel to one another while taking into consideration known manufacturing tolerances.

Food cooked on lower cooking plate 16 contacts an upper surface of ribs 26. Forward or lower end portions 28 of ribs 26 extend upwardly to a greater elevation above lower cooking plate 16 than the elevation of the remainder of ribs 26 above lower cooking plate 16. The raised end portions 28 of rib 26 prevent foodstuffs from sliding or otherwise moving down and off of inclined ribs 26.

Device 10 may include at least one heating element (not visible) operatively coupled to lower cooking plate 16 for supplying heat to lower cooking plate 16 and ribs 26. Upper cooking plate 18 may also be heated by another heating element (not visible) in a similar manner. The heating elements may be operated by way of a switch 34 mounted on upper unit 14. It is to be appreciated that switch 34 may be configured to operate the heating elements in both lower cooking plate 16 and upper cooking plate 18 simultaneously, or separately if so desired.

In embodiments where lower cooking plate 16 is sloped downwardly at an angle to the horizontal plane, liquid emitted by foodstuffs may be directed toward a front edge or end 36 of lower cooking plate 16 through grooves 27. As seen more clearly in FIG. 3, front end 36 of lower cooking plate 16 may be sloped or curved downwardly, allowing liquids that have been carried forwardly through grooves 27 to be directed downwardly off of front end 36 into a collecting member 40 positioned beneath front end 36. In certain embodiments, collecting member 40 may be separable from and replaceable with respect to lower cooking plate 16 and base unit 12 for removing liquid collected in collecting member 40.

As seen in FIG. 2, a cooking insert 44 may be configured to be positioned on the upper surface of lower cooking plate 16, and beneath upper cooking plate 18, in order to cook portions of a breakfast sandwich when cooking device 10 is in its closed condition, using the heat from the heating element in lower cooking plate 16. Cooking insert 44 may include a base member 46 having a first portion 47 defining a cooking surface 48. In certain embodiments, cooking surface 48 is substantially planar, and can be used to cook breakfast meats thereon, such as bacon and sausage, for example.

Cooking insert 44 may also include a second, or egg cooking portion 50. Egg cooking portion 50 may extend upwardly above cooking surface 48 and include one or more cavities 52, each cavity 52 defining an egg cooking surface 53. Each cavity 52 may be configured to hold a liquid egg to be cooked within cooking device 10. In the embodiment illustrated in FIG. 2, cooking surface 53 of cavity 52 of egg cooking portion 50 has a substantially planar surface, but it is to be appreciated that cooking surface 53 may have surface discontinuities formed therein, including ribs, or other projections, and/or grooves or other recesses formed in or on cooking surface 53. Such surface discontinuities would naturally form mirror images of those discontinuities in the surface of an egg cooked within cavity 52.

Cavity 52 may be designed and sized to hold the liquid egg volume of a large egg. The volume of a large egg may be approximately 3.05 $in^3$. In certain embodiments, the volume of a cavity 52 may be approximately 4.35 $in^3$, allowing for the expansion of the egg as it cooks in cavity 52. It is to be appreciated that cavity 52 can be sized to house the volume of an egg of any size.

In the embodiment illustrated in FIG. 2, each cavity 52 is circular with a diameter D, which will produce a cylindrical cooked egg. In certain embodiments, the diameter of each cavity 52 is approximately 2.65 inches. It is to be appreciated that the value of diameter D and height H of cavity 52 can be varied to produce a cavity with any desired volume, and any desired height and diameter.

In certain embodiments, a front edge or end 54 of cooking insert 44 may be sloped or curved downwardly, allowing liquids from cooking surface 48 to be directed downwardly off of front end 54 into collecting member 40. Cooking surface 48 may also include a retaining wall 56 extending about its side and rear edges, preventing liquids from flowing outwardly off the side and rear edges of cooking surface 48.

Figure 4:
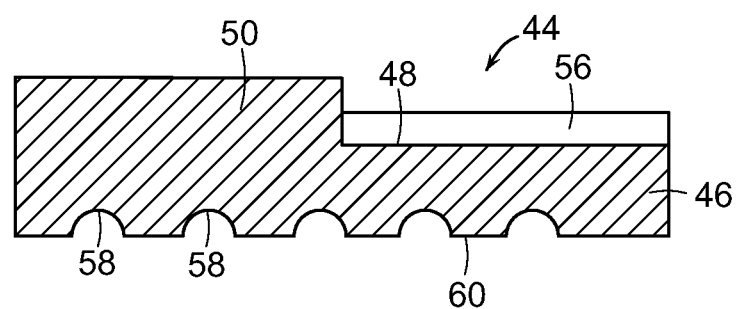
FIG. 4 is a section view of an alternative embodiment of the cooking insert of FIG. 2.

In certain embodiments, as illustrated in FIG. 4, a plurality of grooves 58 may be formed in a lower or bottom surface 60 of base member 46 of cooking insert 44. Grooves 58 may be sized and configured such that they mate with ribs 26 of lower cooking plate 16. In such embodiments, when cooking insert 44 is placed on lower cooking plate 16, the entire bottom surface 60 of base member 46 is in contact with lower cooking plate 16, thereby increasing efficiency and reducing the cooking time of foodstuffs in cooking insert 44.

In the illustrated embodiment, grooves 58 are shown as substantially hemi-spherical in cross-section to mate with ribs 26. It is to be appreciated that grooves 58 can have any desired cross-sectional shape. Grooves 58 may also be substantially parallel with one another. The term "substantially parallel" as used herein with respect to grooves 58 is to be understood to mean that grooves 58 are designed to be and are parallel to one another while taking into consideration known manufacturing tolerances.

Figure 5:
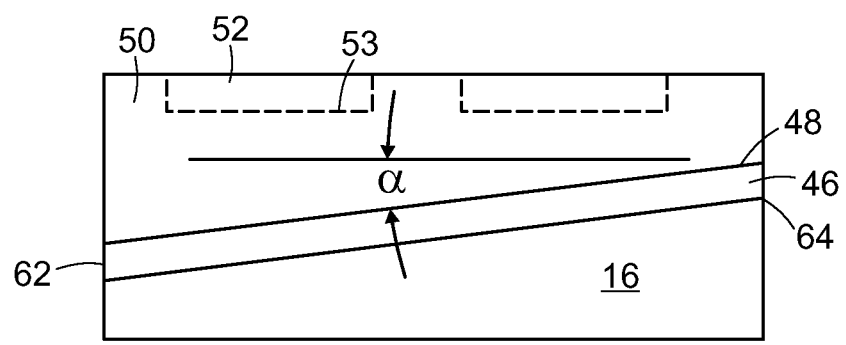
FIG. 5 is a schematic elevation view of an alternative embodiment of the cooking insert of FIG. 2, shown disposed on the lower cooking plate of FIG. 3.

In certain embodiments, as illustrated schematically in FIG. 5, bottom surface 60 of base member 46 of cooking insert 44 may be sloped or slanted at an angle α with respect to a horizontal plane, with cooking surface 48 sloping downwardly and forwardly at the same angle α. Bottom surface 60 may be sloped upwardly from a front edge 62 thereof to a rear edge 64 thereof. In certain embodiments, angle α may be the same as the angle at which lower plate 16 is sloped. Thus, when cooking insert 44 is positioned on lower cooking plate 16, the front-to-rear upwardly sloped bottom surface 60 counteracts the rear-to-front downwardly sloped upper surface of lower cooking plate 16, allowing cooking surface 53 of each cavity 52 to be substantially level and, therefore allowing liquid eggs cooked in cavity 52 to be cylindrically shaped.

Figure 6:
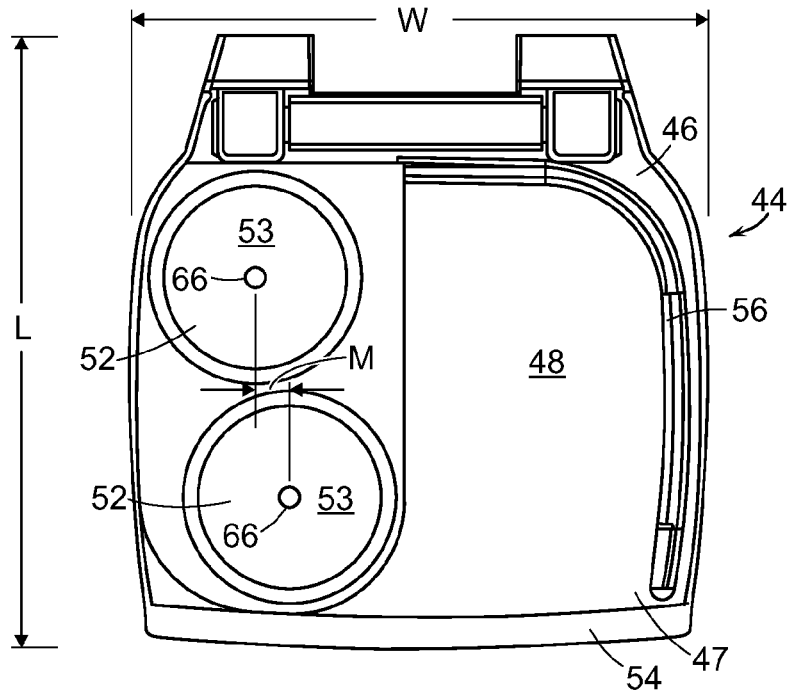
FIG. 6 is a plan view of the cooking insert of FIG. 2.

As illustrated in FIG. 6, cooking insert has a width W and length or depth L, which may be varied to mate with the width and depth of a corresponding cooking device 10 within which cooking insert 44 is positioned. As illustrated here, two cavities 52 may be formed in egg cooking portion 50. Centers 66 of the two cavities 52 may be offset laterally from one another by a distance M, allowing the two cavities to be closer to one another in a front-to-back direction with respect to cooking insert. Such a configuration allows for a shorter depth L of cooking insert 44.

Figure 7:
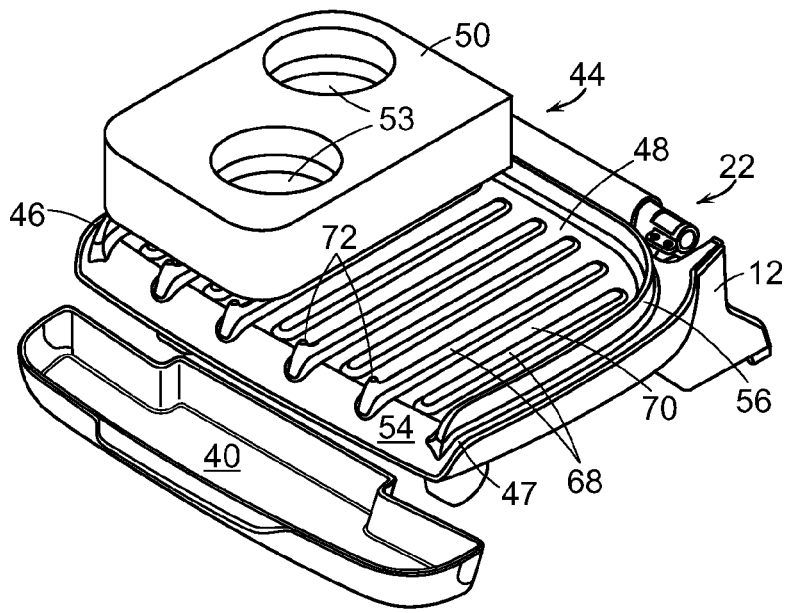
FIG. 7 is a perspective view of an alternative embodiment of the cooking insert of FIG. 2, shown positioned on a lower cooking plate of the cooking device of FIG. 1.

As noted above and illustrated in FIG. 2, in certain embodiments, cooking surface 48 may be substantially planar. It is to be appreciated that in other embodiments, such as that illustrated in FIG. 7, cooking surface 48 may include a plurality of ribs 68 that act as grilling members, with corresponding grooves 70 formed between ribs 68. Ribs 68 may be of unitary, that is, one-piece construction with cooking surface 48. Alternatively, ribs 68 could be separately formed and subsequently secured to the upper surface of cooking surface 48 in any suitable manner. As illustrated here, ribs 68 are substantially hemispherical in cross-section. It is to be appreciated that ribs 68 can have any desired cross-sectional shape. Ribs 68 and grooves 70 may be substantially parallel with one another, allowing liquids from cooked food to flow downwardly along cooking surface 48 through grooves 70 in an unimpeded fashion. The term "substantially parallel" as used herein with respect to ribs 68 and grooves 70 is to be understood to mean that ribs 68 and grooves 70 are designed to be and are parallel to one another while taking into consideration known manufacturing tolerances.

Food cooked on cooking surface 48 contacts an upper surface of ribs 68. Forward or lower end portions 72 of ribs 68 extend upwardly to a greater elevation above cooking surface 48 than the elevation of the remainder of ribs 68 above cooking surface 48. The raised end portions 72 of ribs 68 prevent foodstuffs from sliding or otherwise moving down and off of inclined ribs 68.

Figure 8:
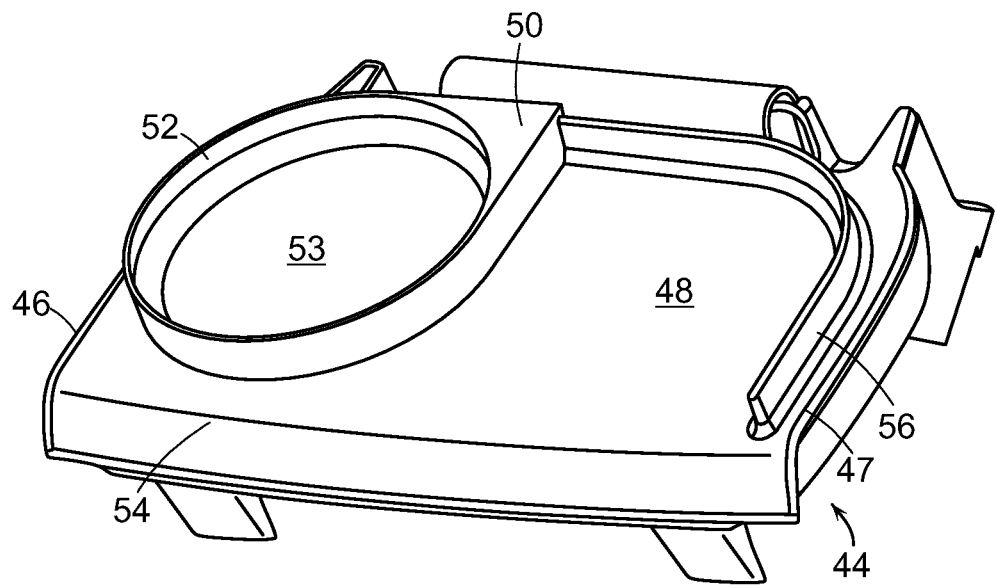
FIG. 8 is a perspective view of view of an alternative embodiment of the cooking insert of FIG. 2.
Figure 9:
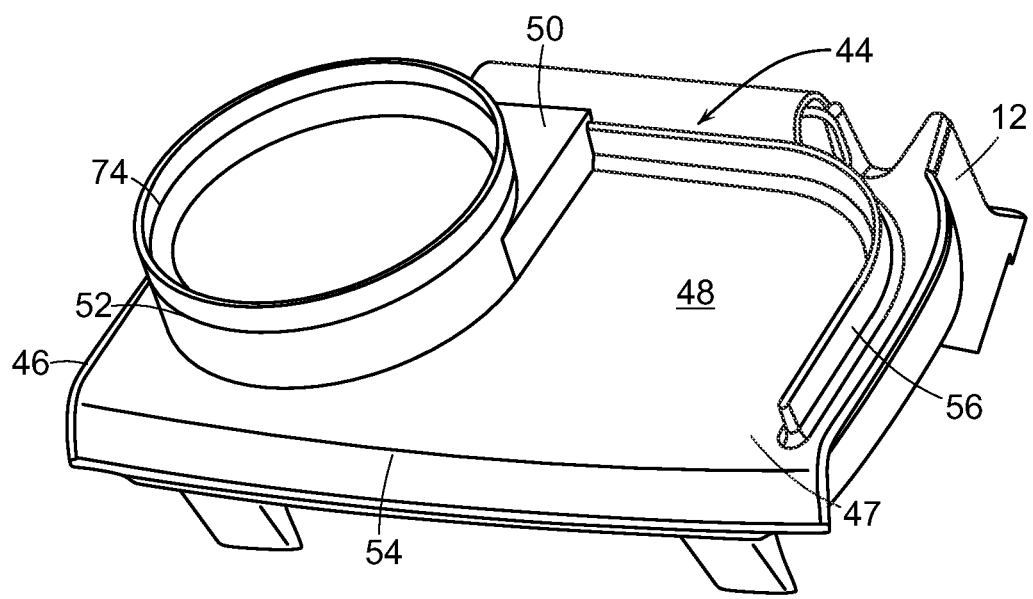
FIG. 9 is a perspective view of another alternative embodiment of the cooking insert of FIG. 2.

In the embodiments illustrated above, egg cooking portion 50 of cooking insert 44 includes two cavities 52 for simultaneously cooking two liquid eggs. It is to be appreciated that egg cooking portion 50 can include any desired number of cavities. For example, as illustrated in FIG. 8, egg cooking portion 50 may include a single cavity 52. In such an embodiment, the depth L of cooking insert 44 can be reduced as compared to the length of a cooking insert 44 including two cavities 52 in egg cooking portion 50. In certain embodiments, the diameter of the single cavity 52 may be approximately 3.5 inches.

In certain embodiments, an egg cooking insert 74 may be positioned within each cavity 52 such that a liquid egg cooked within cavity 52 is wholly retained within insert 74. Once the egg is cooked, insert 74 can simply be removed from cavity 52 of egg cooking portion 50 and the cooked egg can be removed from insert 72. This eliminates the need to take the entire cooking insert 44 off of lower cooking plate 16 in order to remove the cooked egg from cavity 52. It is to be appreciated that insert 74 may be formed of a disposable material, such as a plastic material. In other embodiments, insert 74 may be formed of a metal, and, in particular, may be formed of the same material as the remainder of egg cooking portion 50.

Figure 10:
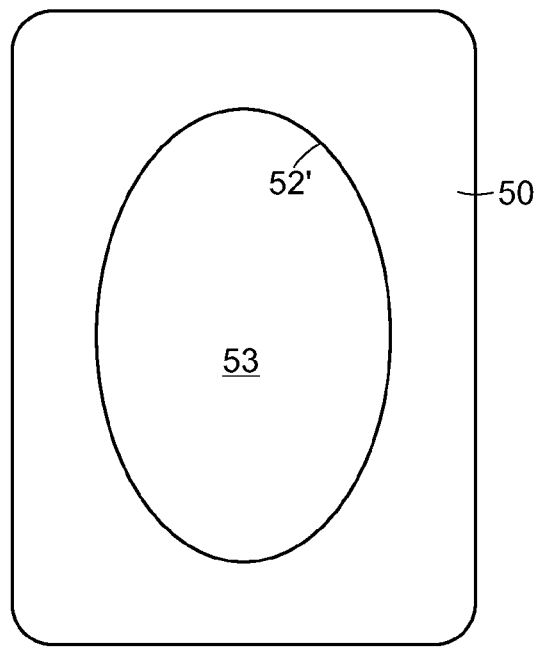
FIG. 10 is a plan view of an alternative embodiment of the second portion of the cooking insert of FIG. 6.
Figure 11:
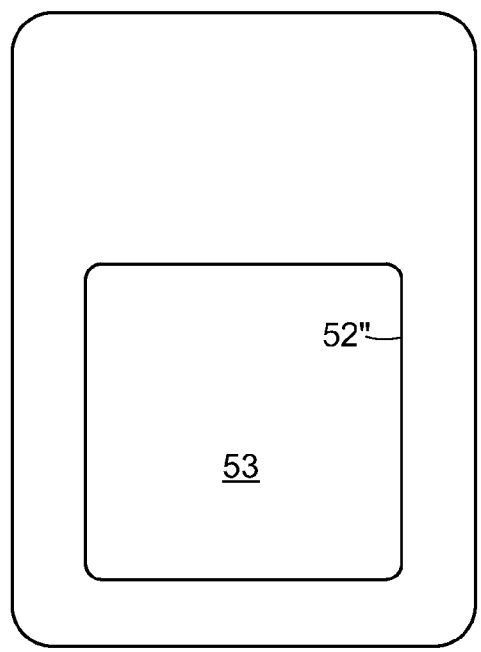
FIG. 11 is a plan view of another alternative embodiment of the second portion of the cooking insert of FIG. 6.

In the embodiments illustrated in FIGS. 2 and 6-9, egg cooking portion 50 has circular cavities 52, which will produce cylindrical cooked eggs. It is to be appreciated that cavities 52 can have other shapes. For example, as illustrated in FIG. 10, a cavity 52' may have an oval shape. As illustrated in FIG. 11, a cavity 52" may have a rectangular cross-sectional shape, and more particularly a square cross-sectional shape. It is to be appreciated that each cavity 52 of egg cooking portion 50 can have any desired closed cross-sectional shape that will contain a liquid egg.

Figure 12:
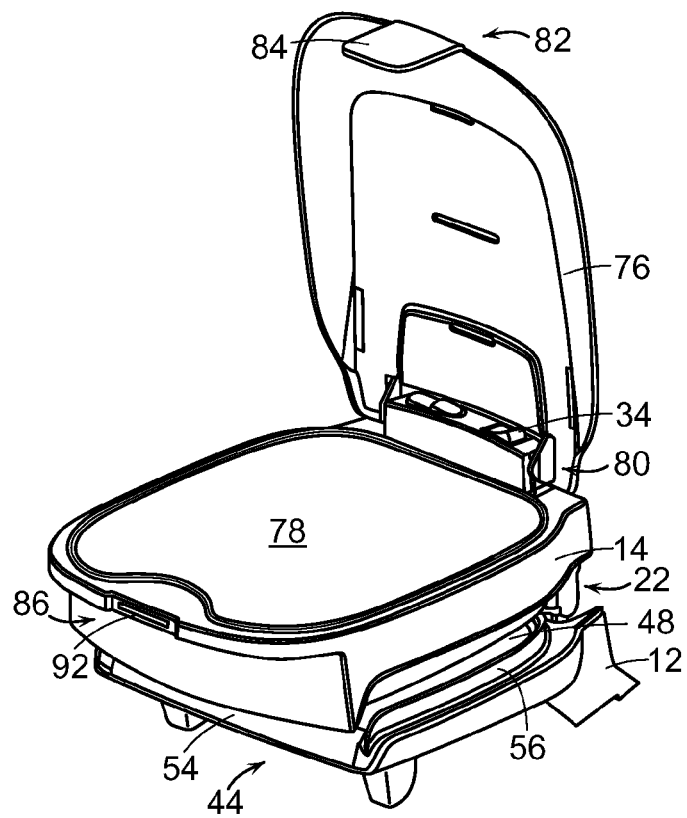
FIG. 12 is a perspective view of the cooking device of FIG. 1, shown with its lid open and exposing a heating surface of the upper unit of the cooking device.
Figure 13:
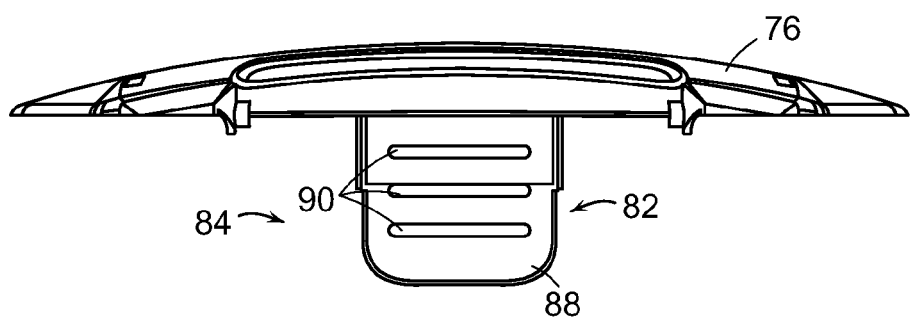
FIG. 13 is a rear elevation view of the lid of the cooking device of FIG. 1.

In certain embodiments, as illustrated in FIGS. 12-13, upper unit 14 of cooking insert 44 may include a lid 76 that pivots upwardly to reveal a heating surface 78 formed on an upper surface of upper unit 14. Heating surface 78 is configured to heat, cook, warm, or toast meat items, including, for example, ham, sausage, and bacon, and bread items used for breakfast sandwiches including, for example, bagels, English muffins, biscuits, and slices of bread through the heat generated from the heating element in upper unit 14. In the embodiment illustrated in FIG. 12, heating surface 78 has a substantially planar surface, but it is to be appreciated that heating surface 78 may have surface discontinuities formed therein, including ribs, or other projections, and/or grooves or other recesses formed in or on heating surface 78.

Lid 76 may be pivotally connected to upper unit 14 by a second floating hinge 80 that allows lid 76 to move vertically, and to be pivotally moved relative to the upper unit 14 from a closed position as seen in FIG. 1 to an open position as seen in FIG. 12. In certain embodiments, lid 76 may be transparent or at least partially transparent in order to allow a user to observe the breakfast sandwich items being heated or toasted on heating surface 78.

Lid 76 may be releasably secured to upper unit 14 by way of a fastener 82. Fastener 82 may include a first portion 84 on lid 76 and a second portion 86 on upper unit 14. In certain embodiments, first and second portions 84, 86 are configured to releasably engage and interlock with one another, thereby securing lid 76 in a fixed position. In certain embodiments, fastener 82 is configured such that lid 76 may be secured to upper unit 14 at different heights, to accommodate bread items of different thicknesses.

An exemplary fastener 82 is shown in FIGS. 12-13, where first portion 84 is formed of a flange member 88 extending downwardly from a front edge of upper unit 14, and a plurality of ribs or tabs 90 extending outwardly from the rear surface of flange member 88. In the illustrated embodiment, flange member 88 includes three tabs 90. However, it is to be appreciated that flange member 88 can have any number of tabs 90.

Second portion 86 of fastener 82 may include a groove or recess 92 formed on a front surface of upper unit 14 and configured to mate with one of tabs 90. When lid 76 is closed, one of tabs 90 is engaged in snap-fit fashion with recess 92, thereby securing lid 76 to upper unit 14. By engaging different tabs 90 in recess 92, the height of lid 76 in its closed condition can be controlled to adapt to bread items of different thickness. To release fastener 82, flange member 88 is simply pulled outwardly, thereby releasing the engagement of tab 90 and recess 92.

It is to be appreciated that fastener 82 is simply one embodiment of an adjustable fastener suitable for releasably engaging lid 76 and upper unit 14. Other suitable adjustable and releasable fasteners will become readily apparent to those skilled in the art, given the benefit of this disclosure.

In certain embodiments, some or all of the surfaces of cooking insert 44 and cooking device 10 are non-stick surfaces, allowing for improved cleanup of cooking insert 44. For example, any or all of cavity 52 where the liquid egg is cooked, cooking surface 48 where meats are cooked, and heating surface 78 where meats and/or bread items are cooked or heated, could have a non-stick surface while the remainder of cooking insert 44 and cooking device 10 need not have such a non-stick surface. In other embodiments, the entirety of cooking insert 44 and cooking surfaces of cooking device 10 could have a non-stick surface. In certain embodiments, the non-stick surface could be a polytetrafluoroethylene (PTFE) based coating, a ceramic coating, or an enamel coating, for example. Other suitable materials for a non-stick surface will become readily apparent to those skilled in the art, given the benefit of this disclosure.

In certain embodiments, cooking insert 44 can be formed of aluminum or steel. Other suitable metals and materials for cooking insert 44 will become readily apparent to those skilled in the art, given the benefit of this disclosure. Cooking insert 44 may be formed by casting, or any other suitable manufacturing process.

Through the use of cooking insert 44 with cooking device 10, a user can easily cook one or more liquid eggs in a cavity 52, while at the same time heating a breakfast meat on cooking surface 48, and toasting a bread item or cooking a breakfast meat on heating surface 78, thereby quickly and easily cooking all of the ingredients for a breakfast sandwich simultaneously. It is to be appreciated that a user could also warm or heat cheese on either of cooking surface 48 or heating surface 78 if desired. The use of such a combined device allows the user to easily produce their own complete breakfast sandwich.

Further, given that egg cooking portion 50 could include more than one cavity 52, and that the size of cooking surfaces 48 and 78 can be varied to accommodate cooking devices of different sizes, it is to be appreciated that a user could simultaneously produce the ingredients for two, or even more, breakfast sandwiches using a cooking insert 44 with a cooking device 10 as described herein.

Figure 14:
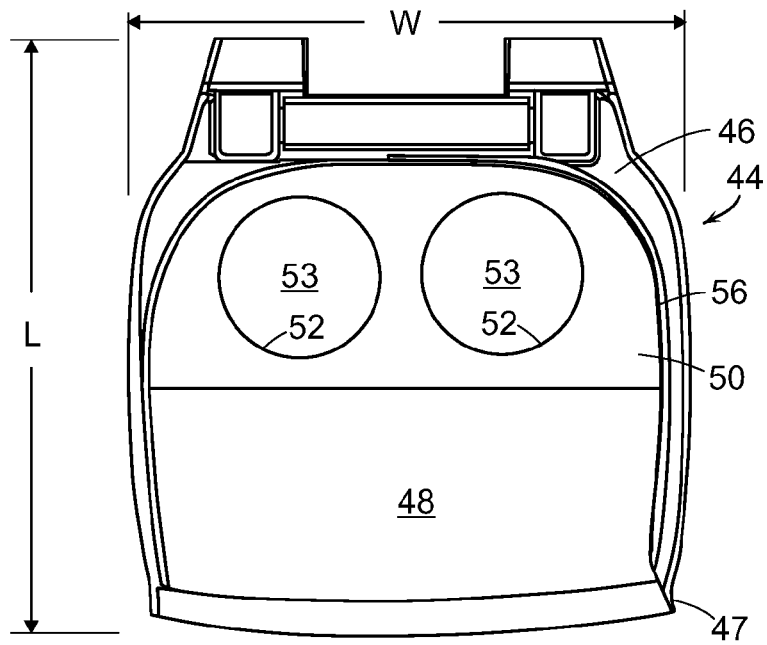
FIG. 14 is a plan view of an alternative embodiment of the cooking insert of FIG. 2.

Another embodiment of a cooking insert 44 is seen in FIG. 14. In this embodiment, in contrast to the embodiment shown in FIG. 6, egg cooking portion 50 is positioned in the rear portion or area of cooking insert 44, with cooking surface 47 positioned in the front portion or area of cooking insert 44. As illustrated here, egg cooking portion 50 includes two cavities 52 for cooking eggs. As noted above, and illustrated below, egg cooking portion 50 may include one cavity 52, and could include more than two cavities 52.

Figure 15:
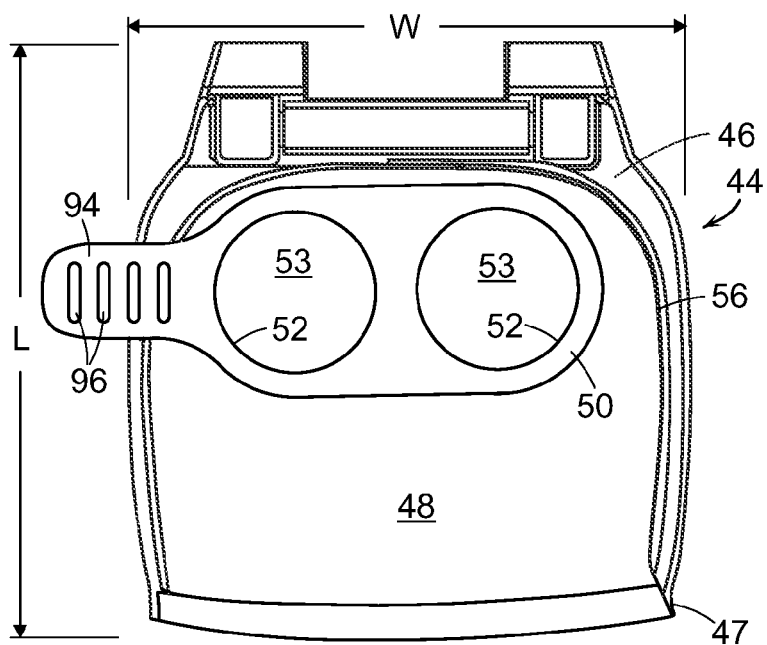
FIG. 15 is a plan view of another alternative embodiment of the cooking insert of FIG. 2.

In certain embodiments, as illustrated in FIG. 15, egg cooking portion 50 may be removable from cooking insert 44, and may include a handle 94 extending outwardly from egg cooking portion 50. H. As illustrated here, egg cooking portion 50 is positioned such that handle 94 extends outwardly from the left right side of cooking insert 44. It is to be appreciated that egg cooking portion 50 can be positioned within cooking insert 44 such that handle 94 extends outwardly toward the right of cooking insert 44.

Handle 94 may include one or more grip-enhancing members such as ribs 96 illustrated in FIG. 15, where ribs 96 are seen to extend across the top surface of handle 94, substantially perpendicular to a longitudinal axis of handle 94. It is to be appreciated that any number of ribs 96 can be provided on handle 94. Further, one or more ribs 96 can also be provided on the bottom surface of handle 94. It is to be appreciated that the grip-enhancing member(s) of handle 94 can take any desired form. For example, the grip-enhancing member(s) could alternatively be grooves or recesses formed in handle 94, or any other type of projection extending outwardly from the surface of handle 94, or any combination of grooves/recesses formed in handle 94 and ribs/projections extending outwardly from handle 94.

In certain embodiments, egg cooking portion 50 may be positioned directly on top of the surface of cooking insert 44. In such an embodiment, cooking surface 47 would extend across substantially the entire expanse of cooking insert 44, with egg cooking portion 50 seated directly on cooking surface 47

Figure 16:
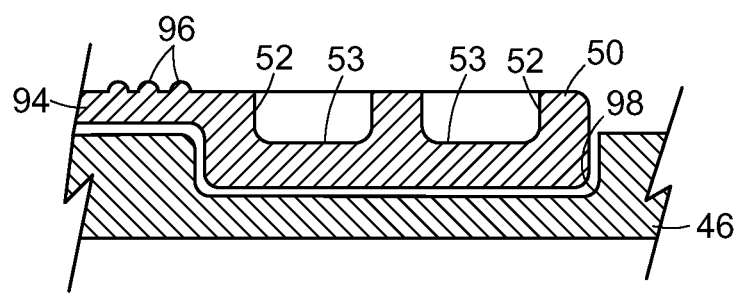
FIG. 16 is a section view, shown partially broken away, taken along lines 16-16 of FIG. 15

In other embodiments, as illustrated in FIG. 16, rather than being seated on the surface of cooking insert 44, egg cooking portion 50 may be received in a recess 98 formed in cooking insert 44. In such an embodiment, heat is conducted into egg cooking portion 50 both through its bottom surface as well as through its sidewalls.

Figure 17:
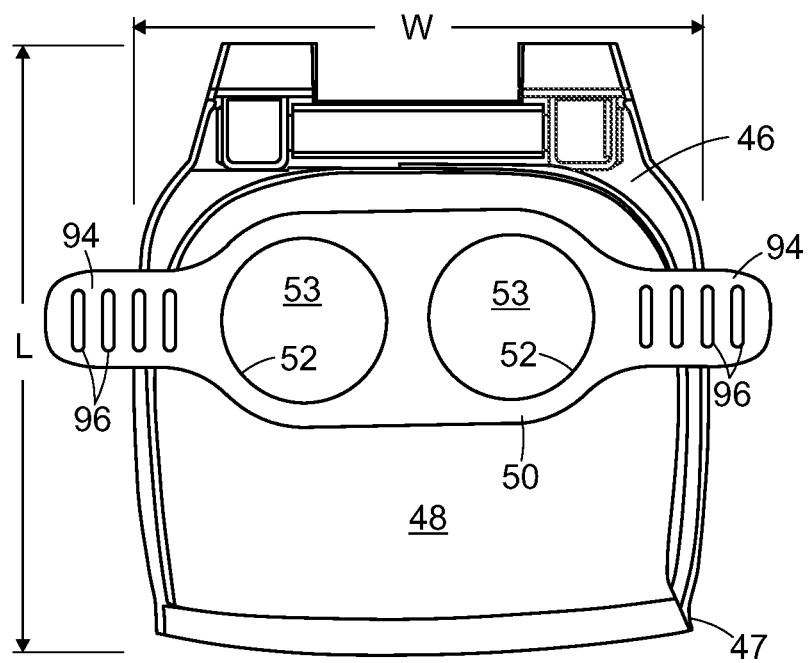
FIG. 17 is a plan view of yet another alternative embodiment of the cooking insert of FIG. 2.

In other embodiments, as illustrated in FIG. 17, egg cooking portion 50 may include two handles 94, allowing the user to grasp either or both of the handles 94 easily to remove egg cooking portion 50 from cooking device 10.

Figure 18:
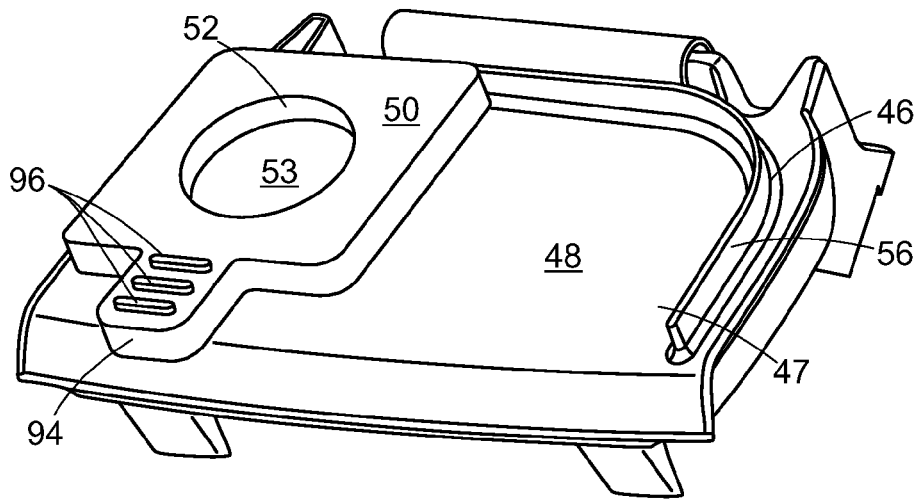
FIG. 18 is a perspective view of a further alternative embodiment of the cooking insert of FIG. 2.
Figure 19:
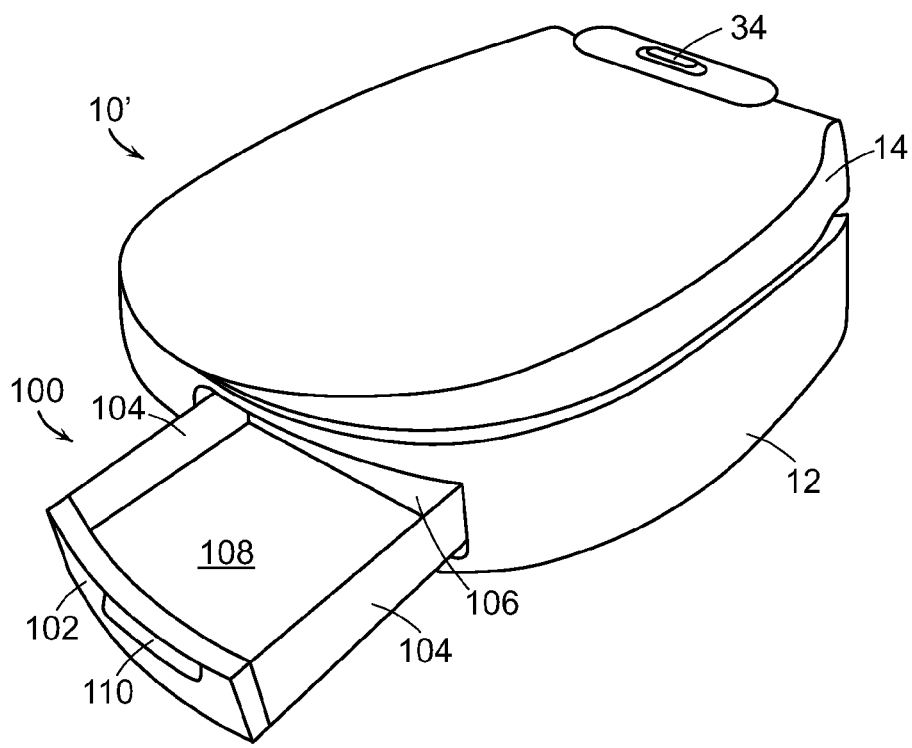
FIG. 19 is a perspective view of an alternative embodiment of the cooking device of FIG. 1.

Yet another embodiment is illustrated in FIG. 18, in which egg cooking portion 50 includes a single cavity 52, is removable from cooking insert 44, and includes a handle 94. As seen here, handle 94 extends forwardly from cooking insert 44. However, it is to be appreciated that egg cooking portion 50 can be oriented such that handle 94 extends outwardly to the left or right of cooking insert 44. As described above with respect to FIGS. 15-17, such a removable egg cooking portion 50 can be seated directly on cooking insert 44 or received in a recess formed in cooking insert 44.

As illustrated in FIG. 10, an alternative cooking device 10' may include a heating drawer 100 in base unit 12, in which bread items can be heated. In this embodiment heating drawer 100 includes a front wall 102, a pair of opposed sidewalls, 104, a rear wall 106, and a bottom 108. Front wall 102 may include a handle 110 to allow the user to easily grasp heating drawer 100 and move it outwardly from base unit 12. In the illustrated embodiment, handle 110 is a recess formed in front wall 102. It is to be appreciated that handle 110 can take any form, and can be, for example, a drawer pull or other member secured to front wall 102 that allows a user to grasp and pull heating drawer 100 outwardly from base unit 12.

It is naturally to be appreciated that cooking device 10' can incorporate any of the embodiments described above.

Thus, for example, any embodiments of the egg cooking portion 50 or the cooking surface 48 described above, can be used in combination with cooking device 10'.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A cooking insert for use with a cooking device having a base unit including a lower cooking plate disposed at an angle with respect to a horizontal plane and having a plurality of ribs formed on an upper surface thereof, and an upper unit including an upper cooking plate and pivotally connected to the base unit with a floating hinge, the insert comprising:
    a base member having a first portion and a second portion, the first portion defining a cooking surface, a plurality of grooves formed in a bottom surface of the base member, the grooves configured to mate with the ribs such that an entire bottom surface of the base member is configured to contact the upper surface of the lower cooking plate of the cooking device when the base member is positioned on the lower cooking plate; and
    a cavity formed in an upper surface of the second portion, wherein a bottom surface of the base member is angled such that a cooking surface of the cavity is substantially level when the insert is placed on the angled lower cooking plate.

2. The cooking insert of claim 1, wherein the grooves are substantially parallel to one another.

3. The cooking insert of claim 1, wherein the bottom surface is angled at approximately 8° with respect to the cooking surface of the cavity.

4. The cooking insert of claim 1, further comprising a plurality of ribs on the cooking surface and extending from a rear portion to a front portion of the cooking surface.

5. The cooking insert of claim 1, wherein the second portion includes at least one additional cavity formed in the upper surface thereof.

6. The cooking insert of claim 5, wherein a center point of the cavity and a center point of the additional cavity are laterally offset from one another.

7. The cooking insert of claim 1, wherein a bottom surface of the base member includes a plurality of grooves extending from a rear portion to a front portion of the base member.

8. The cooking insert of claim 1, wherein a front edge of the cooking surface is curved downwardly.

9. The cooking insert of claim 1, further comprising a retaining wall extending about a side edge and a rear edge of the cooking surface.

10. The cooking insert of claim 1, further comprising an insert removably received in the cavity.

11. The cooking insert of claim 1, wherein the cavity is one of circular, oval, and rectangular.

12. The cooking insert of claim 1, wherein a portion of the base member includes a non-stick surface.

13. The cooking insert of claim 12, wherein the non-stick surface is on one of the cavity and the cooking surface.

14. The cooking insert of claim 12, wherein the non-stick surface is formed of one of a PTFE coating and a ceramic coating.

15. The cooking insert of claim 1, wherein one of the first portion and the second portion is positioned in front of the other.

16. The cooking insert of claim 1, wherein the second portion is removable with respect to the base member.

17. The cooking insert of claim 16, wherein the base member includes a recess, the second portion being received in the recess.

18. The cooking insert of claim 1, wherein the second portion includes a handle.

19. The cooking insert of claim 18, wherein the handle includes a grip-enhancing member.

20. The cooking insert of claim 18, wherein the second portion includes an additional handle on a side of the second portion opposite the handle.

21. A cooking device comprising:
a base unit including a lower cooking plate disposed at an angle with respect to a horizontal plane and having plurality of ribs formed on an upper surface of the lower cooking plate;
an upper unit including an upper cooking plate and pivotally connected to the base unit with a floating hinge;
a cooking insert configured to be positioned between the lower and upper cooking plates and comprising:
a base member having a first portion and a second portion, the first portion defining a cooking surface, a plurality of grooves formed in a bottom surface of the base member, the grooves configured to mate with the ribs such that an entire bottom surface of the base member is configured to contact the upper surface of the lower cooking plate of the cooking device when the base member is positioned on the lower cooking plate; and
a cavity formed in an upper surface of the second portion,
wherein a bottom surface of the base member is angled such that a cooking surface of the cavity is substantially level when the cooking insert is placed on the angled lower cooking plate.

22. The cooking device of claim 21, further comprising a heating surface formed on an upper surface of the upper unit; and
a lid pivotally connected to the upper unit and operable to cover and uncover the heating surface when it is in a closed and an open condition, respectively.

23. The cooking device of claim 22, wherein the lid is pivotally connected to the upper unit with a floating hinge.

24. The cooking device of claim 22, further comprising a fastener to releasably secure the lid to the upper unit.

25. The cooking device of claim 24, wherein the fastener includes a first portion on the lid and a second portion on the upper unit.

26. The cooking device of claim 25, wherein the first portion includes a flange member extending downwardly from a front edge of the upper unit and a plurality of tabs extending rearwardly from the flange member; and
wherein the second portion includes a recess configured to receive one of the tabs.

27. The cooking device of claim 22, wherein the lid is at least partially transparent.

28. The cooking device of claim 21, wherein the grooves are substantially parallel to one another.

29. The cooking device of claim 21, wherein the ribs on the cooking surface extend from a rear portion to a front portion of the cooking surface.

30. The cooking device of claim 21, further comprising an additional cavity formed in the upper surface of the second portion.

31. The cooking device of claim 30, wherein a center point of the cavity and a center point of the additional cavity are laterally offset from one another.

32. The cooking device of claim 21, further comprising a collector positioned beneath a front end of the cooking device.

33. The cooking device of claim 21, wherein a front edge of the cooking surface is curved downwardly.

34. The cooking device of claim 21, further comprising a retaining wall extending about a side edge and a rear edge of the cooking surface.

35. The cooking device of claim 21, further comprising an insert removably received in the cavity.

36. The cooking device of claim 21, wherein the cavity is one of circular, oval, and rectangular.

37. The cooking device of claim 22, further comprising a non-stick surface on at least one of the cavity, the cooking surface, the heating surface, and the upper cooking plate.

38. The cooking device of claim 37, wherein the non-stick surface is formed of one of a PTFE coating and a ceramic coating.

39. The cooking device of claim 21, wherein one of the first portion and the second portion is positioned in front of the other.

40. The cooking device of claim 21, wherein the second portion is removable with respect to the base member.

41. The cooking device of claim 40, wherein the base member includes a recess, the second portion being received in the recess.

42. The cooking device of claim 21, wherein the second portion includes a handle.

43. The cooking device of claim 42, wherein the handle includes a grip-enhancing member.

44. The cooking device of claim 42, wherein the second portion includes an additional handle on a side of the second portion opposite the handle.

45. The cooking device of claim 21, wherein the base unit includes a heating drawer.

46. A cooking device comprising:
a base unit including a lower cooking plate disposed at an angle with respect to a horizontal plane, a plurality of ribs formed on an upper surface of the lower cooking plate;
an upper unit including an upper cooking plate, a heating surface formed on an upper surface of the upper unit, the upper unit pivotally connected to the base unit with a floating hinge;
a lid pivotally connected to the upper unit and operable to cover and uncover the heating surface when it is in a closed and an open condition, respectively;
a cooking insert configured to be positioned between the lower and upper cooking plates and comprising:
a base member including a first portion and a second portion, the first portion defining a cooking surface, a bottom surface of the base member including a plurality of grooves, each groove configured to receive a rib of the lower cooking plate such that an entire bottom surface of the base member is configured to contact the upper surface of the lower cooking plate of the cooking device when the base member is positioned on the lower cooking plate; and
a cavity formed in an upper surface of the second portion,
wherein a bottom surface of the base member is angled such that a cooking surface of the cavity is substantially level when the insert is placed on the angled lower cooking plate.

* * * * *